United States Patent
Alperovich et al.

(10) Patent No.: US 11,226,966 B2
(45) Date of Patent: Jan. 18, 2022

(54) JOURNALING OF STREAMING ANCHOR RESOURCE(S)

(71) Applicant: Microsoft Technology Licensing, LLC, Redmond, WA (US)

(72) Inventors: Alexander Alperovich, Redmond, WA (US); Boris Shulman, Sammamish, WA (US); Ke Liu, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/590,909

(22) Filed: Oct. 2, 2019

(65) Prior Publication Data
US 2021/0103590 A1 Apr. 8, 2021

(51) Int. Cl.
*G06F 16/2455* (2019.01)
*H04L 29/06* (2006.01)
*H04N 21/24* (2011.01)
*H04N 21/845* (2011.01)

(52) U.S. Cl.
CPC .... *G06F 16/24568* (2019.01); *H04L 65/4084* (2013.01); *H04L 65/607* (2013.01); *H04N 21/2402* (2013.01); *H04N 21/8456* (2013.01)

(58) Field of Classification Search
CPC ............... H04L 65/4084; H04L 65/607; G06F 16/24568; H04N 21/8456
See application file for complete search history.

(56) References Cited

U.S. PATENT DOCUMENTS

| 8,909,875 | B1* | 12/2014 | Ostapovicz | G06F 3/067 |
| | | | | 711/154 |
| 2011/0274179 | A1* | 11/2011 | Holden | H04N 21/6405 |
| | | | | 375/240.25 |

(Continued)

FOREIGN PATENT DOCUMENTS

WO 2020068210 A1 4/2020

OTHER PUBLICATIONS

Chen, Zhong, "Spark Streaming and Azure Stream Analytics", retrieved from "https://blogs.msdn.microsoft.com/streamanalytics/2016/06/16/spark-streaming-and-azure-stream-analytics/" on Sep. 27, 2018, Jun. 16, 2016, 6 pages.

(Continued)

*Primary Examiner* — Wing F Chan
*Assistant Examiner* — Billy H Ng
(74) *Attorney, Agent, or Firm* — Rainier Patents, P.S.

(57) ABSTRACT

Described herein is a system and method of journaling of a streaming anchor resource. An input node can store a value of a property associated with the streaming data in a persistent indexed data structure. The input node can generate an anchor that describes a particular point in time in a data stream. The anchor can include an index into the persistent indexed data structure of the stored value of the property associated with the streaming data. The generated anchor and streaming data can be provided to the downstream node. During recovery of a downstream node, the input node can utilize a received anchor to retrieve a value of a property associated with the streaming data from the persistent indexed data structure, and, provide a batch of data based upon the received anchor and the retrieved property value.

20 Claims, 7 Drawing Sheets

(56) References Cited

U.S. PATENT DOCUMENTS

| | | | |
|---|---|---|---|
| 2015/0188974 A1* | 7/2015 | Garcia-Mendoza Sanchez ......... | H04L 65/4092 |
| | | | 709/231 |
| 2016/0359940 A1 | 12/2016 | Chen et al. | |
| 2017/0126772 A1* | 5/2017 | Campbell ............... | G06F 40/18 |
| 2018/0124141 A1* | 5/2018 | Lewis .................... | H04L 67/32 |
| 2018/0262408 A1* | 9/2018 | Alperovich ............. | H04L 43/04 |

OTHER PUBLICATIONS

U.S. Appl. No. 15/977,916, filed May 11, 2018, Specification and Drawings, 41 pages.
"International Search Report and Written Opinion Issued in PCT Application No. PCT/US2020/045080", dated Nov. 27, 2020, 14 Pages.

* cited by examiner

JOURNALING OF STREAMING ANCHOR RESOURCE(S)

BACKGROUND

Stream processing allows multiple data streams from multiple sources to be processed in real-time. "Streaming" or stream processing refers to receiving streams of data, processing the data by multiple processors and streaming the processed data back out as a single flow.

SUMMARY

Described herein is a system for journaling of a streaming anchor resource, comprising: a processing system comprising a processor and a memory having computer-executable instructions stored thereupon which, when executed by the processor, cause the processing system to: by an input node of a streaming data processing system: in response to a determination to generate an anchor by the input node, store a value of a property associated with the streaming data in a persistent indexed data structure; generate the anchor that describes a particular point in time in a data stream, the anchor comprising an index into the persistent indexed data structure of the stored value of the property associated with the streaming data; and provide the generated anchor and streaming data to the downstream node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to journaling of streaming anchor resource(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding journaling of streaming anchor resource(s). What follows are one or more exemplary systems and methods.

Aspects of the subject disclosure pertain to the technical problem of recovery for stream processing using anchors. The technical features associated with addressing this problem involve, by an input node of a streaming data processing system: in response to a determination to generate an anchor by the input node, storing a value of a property associated with the streaming data in a persistent indexed data structure; generating the anchor that describes a particular point in time in a data stream, the anchor comprising an index into the persistent indexed data structure of the stored value of the property associated with the streaming data; and providing the generated anchor and streaming data to the downstream node. Accordingly, aspects of these technical features exhibit technical effects of more efficiently and effectively storing information (e.g., property(ies)) for recovery of computing nodes and/or output node(s) of a stream processing system), for example, reducing consumption of network bandwidth and/or computing node processing resource(s).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

In some embodiments, the technologies disclosed herein are used in conjunction with pull-based stream processing employing anchor-based technology that facilitates once and only once processing by output node(s). An "anchor" is generated by an input node (e.g., along with data of an output stream) and describes a point in the output stream of the input node, so that other unit(s) of data in the output stream are either before or after any given anchor. For purposes of discussion, data "flows" downstream from an input node through any intermediate computing node(s) to an output node. A request for data is sent upstream from an output node through any intermediate computing node(s) to an input node.

During normal operation, down-stream nodes receive an anchor along with a batch of data. The anchor, generated by the input node that generated the batch of data, is a pointer in the output stream reflecting the last portion of data included in the batch of data. Once a downstream node (e.g., intermediate node and/or output node) has received and processed the batch of data, the downstream node can request another batch of data beginning with the anchor of batch of data last received/processed (e.g., indicative of the downstream node having processed data up to the anchor).

In some embodiments, non-input nodes (e.g., intermediate computing nodes and output nodes) do not need to understand anchors or how the anchors were generated by input nodes. The non-input nodes are responsible for being able to determine comparability of anchors. That is, whether a particular anchor indicates an event or point in the output stream occurring before another anchor, whether the particular anchor is equal to another anchor, or whether the particular anchor indicates an event or point in the output stream occurring after another anchor.

Described herein is a system and method for using journal(s) to persistently store anchor information (e.g., textual value(s)). In response to a determination to generate an anchor by an input node, the input node can generate the anchor to be utilized by downstream node(s) to process streaming data provided in response to the request. As discussed, below requisite comparability of anchors can be maintained.

Instead of storing one or more property(ies) associated with the streaming data (e.g., textual property(ies)) directly in the anchor, the input node can store value(s) of one or more property(ies) associated with the streaming data being provided in response to the request in one or more persistently stored journals. The anchor generated and provided to downstream node(s) can include an index (or indices) into the journal(s). During recovery, a downstream node can provide the anchor with the index (or indices) into the journal(s), which can be used by the input node, to retrieve the value(s) of property(ies) from the journal. A batch of streaming data can be provided to the downstream node based, at least in part, upon the retrieved value(s) of property(ies).

Figure 1:
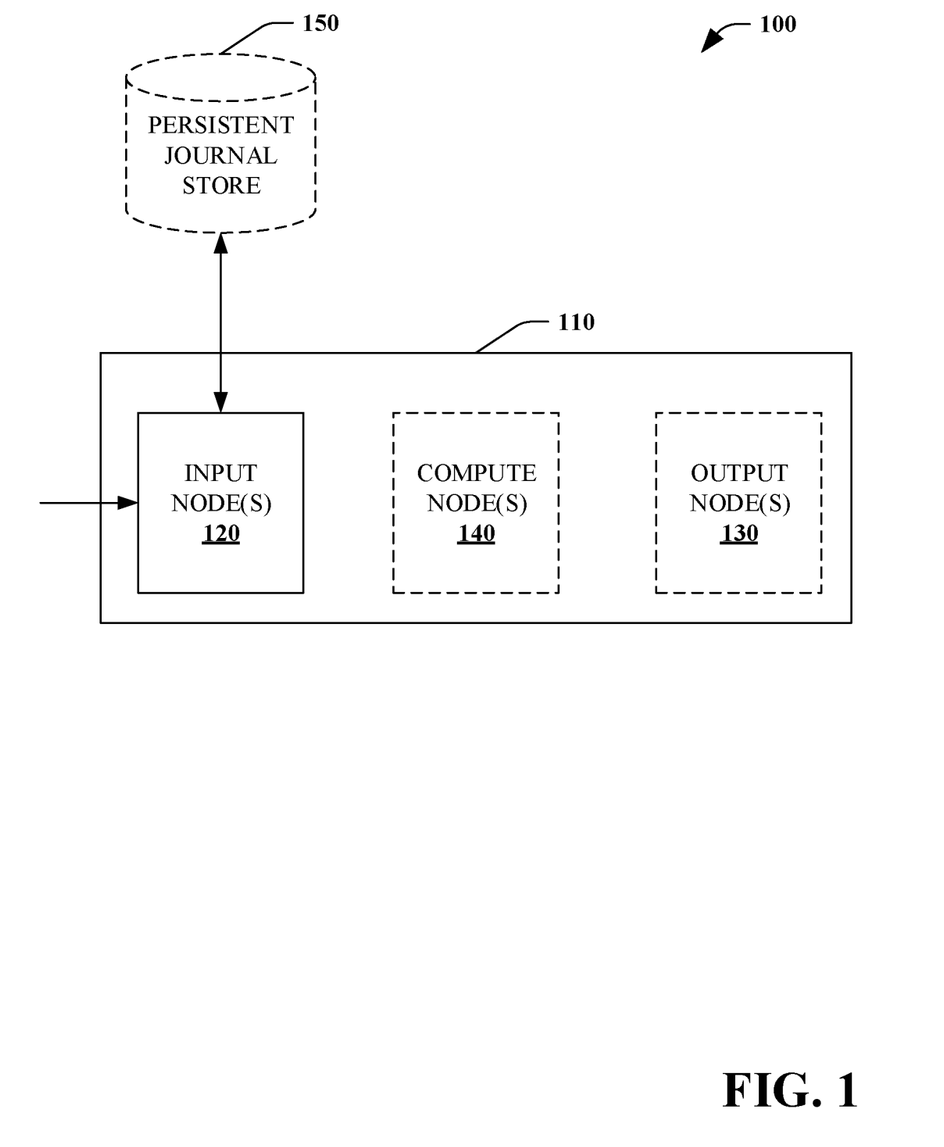
FIG. 1 is a functional block diagram that illustrates a system for journaling of a streaming anchor resource.

Referring to FIG. 1, a system for journaling of a streaming anchor resource 100 is illustrated. The system 100 includes a streaming data processing system 110 having one or more input nodes 120 and one or more output nodes 130. Optionally, the streaming data processing system 110 can further include one or more compute nodes 140. The system 100 further includes one or more persistent journal stores 150.

The system 100 can be used with pull-based stream processing employing anchor-based technology that facilitates once and only once processing by output node(s). A request for data is sent upstream from the output node 130 through any intermediate compute node(s) 140 to the input node 120.

An anchor, generated by the input node 120 that generated the batch of data, is a pointer in the data stream reflecting the last portion of data included in the batch of data. Once a downstream node (e.g., compute node 140 and/or output node 130) has received and processed the batch of data, the downstream node can request another batch of data beginning with the anchor of batch of data last received/processed (e.g., indicative of the downstream node having processed data up to the anchor).

Streaming anchors are thus pointers in the data stream that carry the necessary information to resume processing from a specific point across a plurality of inputs. Additionally, anchors generated by a specific entity must have full order ability among themselves—that is, the anchors must be temporally comparable.

In order to achieve these features, an anchor can carry one or more attributes with some attributes being, for example, numeric (e.g., timestamp, offset, etc.) and some attributes being textual (e.g., resource identifier, paths, a name of an event hub, a full path of a blob, etc.).

In some embodiments, textual attribute(s) can generate memory load on the streaming data processing system 110, since each batch generated by any entity in the system 110 carries the entire tree of anchors spanned by the entity in the topology graph. In some embodiments, each such anchor carries the values mentioned above (e.g., usually twice—once for the ability to compare—binary format and once for the ability to resume—textual/numeric).

To reduce this memory load on the streaming data processing system 110, the input node 120 can use data structure(s) (e.g., journal(s) or table(s)) stored in the persistent journal store 150 to persistently store anchor information (e.g., textual value(s)). Instead of storing one or more property(ies) associated with the streaming data (e.g., textual property(ies)) directly in the anchor, the input node can store value(s) of one or more property(ies) associated with the streaming data being provided in one or more persistently stored data structures (e.g., journals, tables) stored in the persistent journal store 150. The anchor generated and provided to downstream node(s) can include an index (or indices) into the data structure(s) (e.g., journal(s), table(s)). In some embodiments, entry(ies) are only added to the data structure(s) for property(ies) (e.g., pointing to a resource) that have not been previously included in the data structure(s).

In some embodiments, the input node 120 determines to generate the anchor in response to a request for streaming data from a downstream node. In some embodiments, the input node 120 determines to generate the anchor in response to other trigger(s) within the streaming data processing system 110.

In this manner, the memory load on the streaming data processing system 110 can be significantly reduced without affecting the ability of the input node 120 to facilitate recovery of a downstream node. In some embodiments, the memory load can be reduced by approximately two orders of magnitude with respect to metadata carried by the streaming data processing system 110.

During recovery, a downstream node can provide the anchor with the index (or indices) into the data structure(s) (e.g., journal(s), table(s)), which can be used by the input node 120, to retrieve the value(s) of property(ies) from the data structure(s) stored in the persistent journal store 150.

In some embodiments, the persistent journal store 150 is stored physically separate from the streaming data processing system 110. In this manner, failure(s) of input node(s) 120, output node(s) 130, compute node(s) 140, and/or the streaming data processing system 110 itself does not affect the data stored in the persistent journal store 150.

Figure 2:
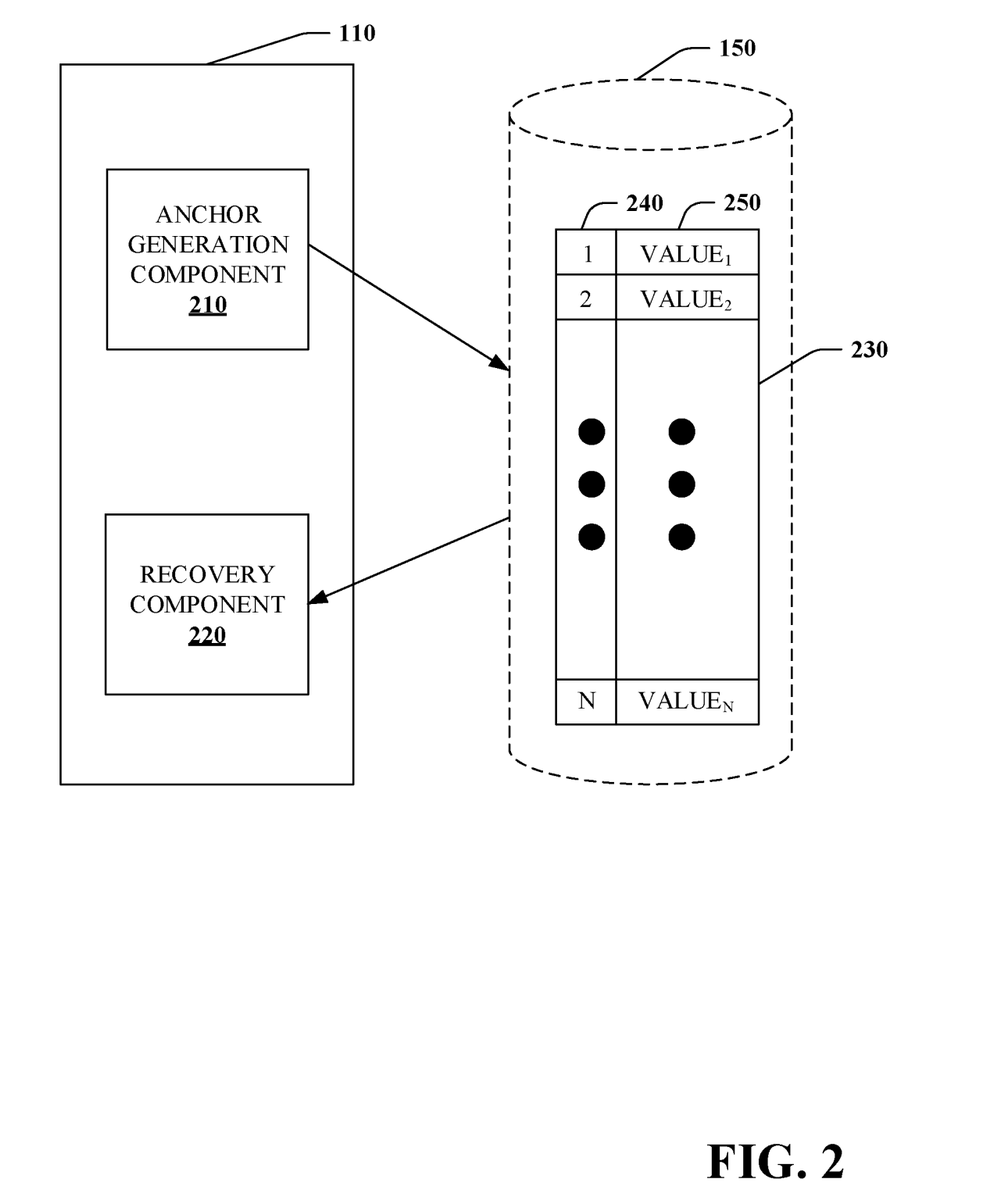
FIG. 2 is a functional block diagram that illustrates an exemplary input component.

Referring to FIG. 2, an input node 120 can include an anchor generation component 210 and a node recovery component 220. During normal operation, in response to a request for streaming data from a downstream node, the input node 120 can obtain streaming data with an anchor generation component 210 generating an anchor to be provided to the downstream node(s) along with the obtained streaming data.

The anchor generation component 210 can store one or more value(s) of property(ies) (e.g., attribute(s)) associated with the streaming data in an append only ordered collection (e.g., data structure such as a journal, table, etc.) in the persistent journal store 150. In some embodiments, only value(s) for specific property(ies) are stored in the persistent journal store 150 with other value(s) for other specific property(ies) being stored directly in the anchor. In some embodiments, values for each specific property are stored in separate data structures in the persistent journal store 150, that is, each specific property has a separate data structure. In some embodiments, the ordered collection comprises a table 230 having an index 240 and a stored value 250.

In some embodiments, indices (e.g., a numeric value) into the ordered collection and anchors are generated in a strictly growing order, for each input node 120. Accordingly, a new anchor and index into the ordered collection (data structure) generated by an input node 120 is greater than (e.g., represents a later point in a stream) any anchor and index previously generated by the particular input node 120. This can allow for the system to store value(s) (e.g., attribute(s)) for anchors in the ordered collection (e.g., data structure such as a journal, table) for use during recovery.

Thus, the anchor generated by the anchor generation component 210 describes a specific point in time in the data stream and include an index (e.g., eight byte numeric value) into the persistent indexed data structure(s) of stored value(s) of property(ies) (e.g., attribute(s)) associated with the streaming data. The input node 120 can then provide the generated anchor and streaming data to the down-stream node.

In some embodiment, during normal operation, the persistent indexed data structure(s) (e.g., journal(s)) are not read, and the only additional overhead is a write operation, which is also done only when there is change in the entity being handled (e.g., such as path, resource identifier, etc.), that is, a change in property(ies)/attribute(s). In some embodiments, these operation(s) are not usually required for every batch.

During recovery of downstream node(s), the node recovery component 220 can utilize information stored in the ordered collection (e.g., data structure, journal, table, etc.) stored in the persistent journal store 150. In response to receiving a request for streaming data commencing with a particular anchor, the node recovery component 220 can retrieve value(s) of property(ies) associated with the particular anchor from the ordered collection (e.g., data structure, journal, table, etc.) stored in the persistent journal store 150. Using the property value(s) retrieved, the input component 120 can provide a batch of streaming data to the downstream node commencing with the anchor.

FIGS. 3-6 illustrate exemplary methodologies relating to journaling of streaming anchor resource(s). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
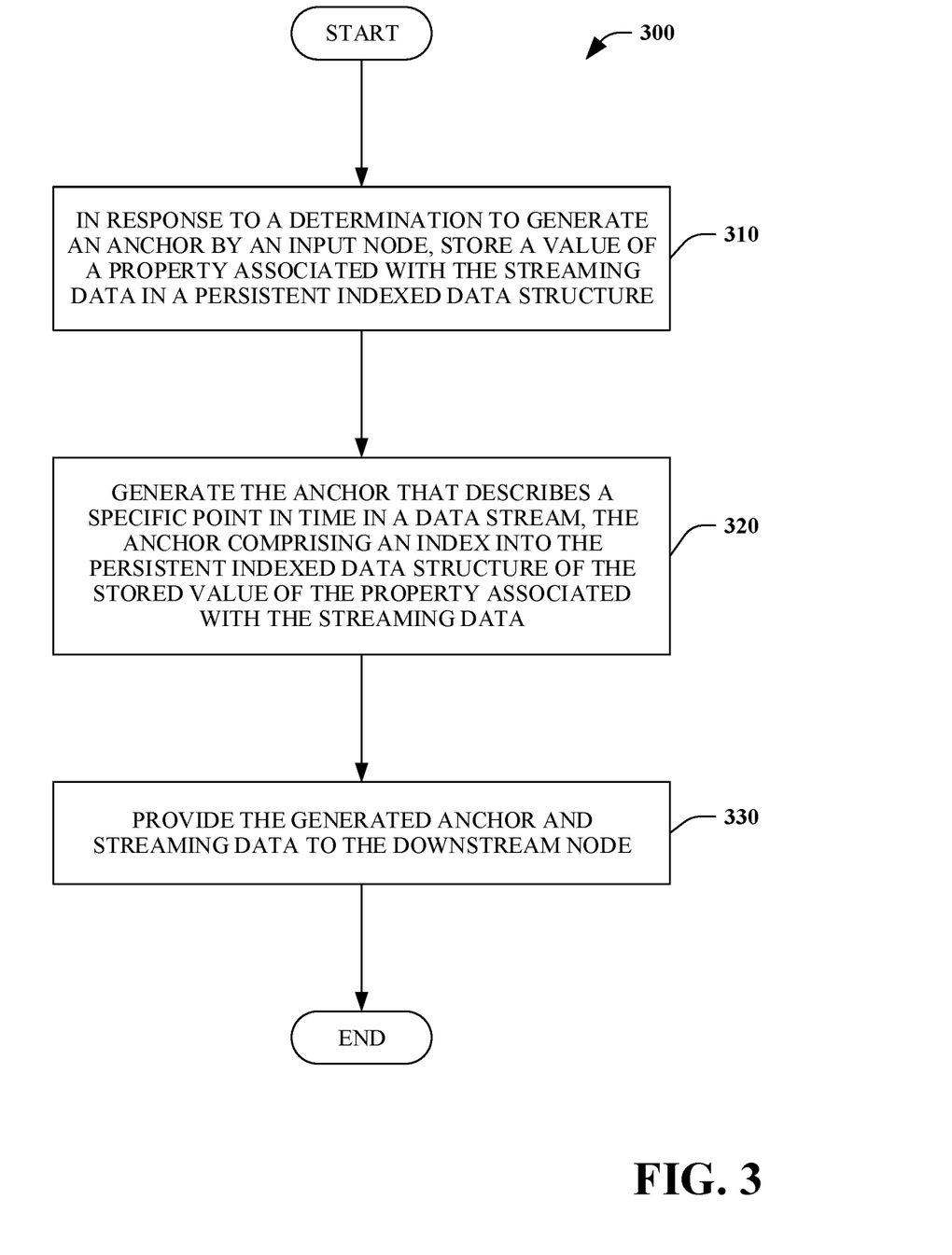
FIG. 3 is a flow chart that illustrates a method of generating a streaming data anchor.

Referring to FIG. 3, a method of generating a streaming data anchor 300 is illustrated. In some embodiments, the method 300 is performed by the input node 120 during normal operation (e.g., non-recovery of input node(s) 110, output node(s) 130, and/or compute node(s) 120) of the streaming data processing system 110.

At 310, in response to a determination to generate an anchor by an input node, a value of a property associated with the streaming data is stored in a persistent indexed data structure. At 320, the anchor that describes a specific point in time in a data stream is generated. The anchor includes an index into the persistent indexed data structure of the stored value of the property associated with the streaming data. At 330, providing the generated anchor and streaming data are provided to the downstream node.

Figure 4:
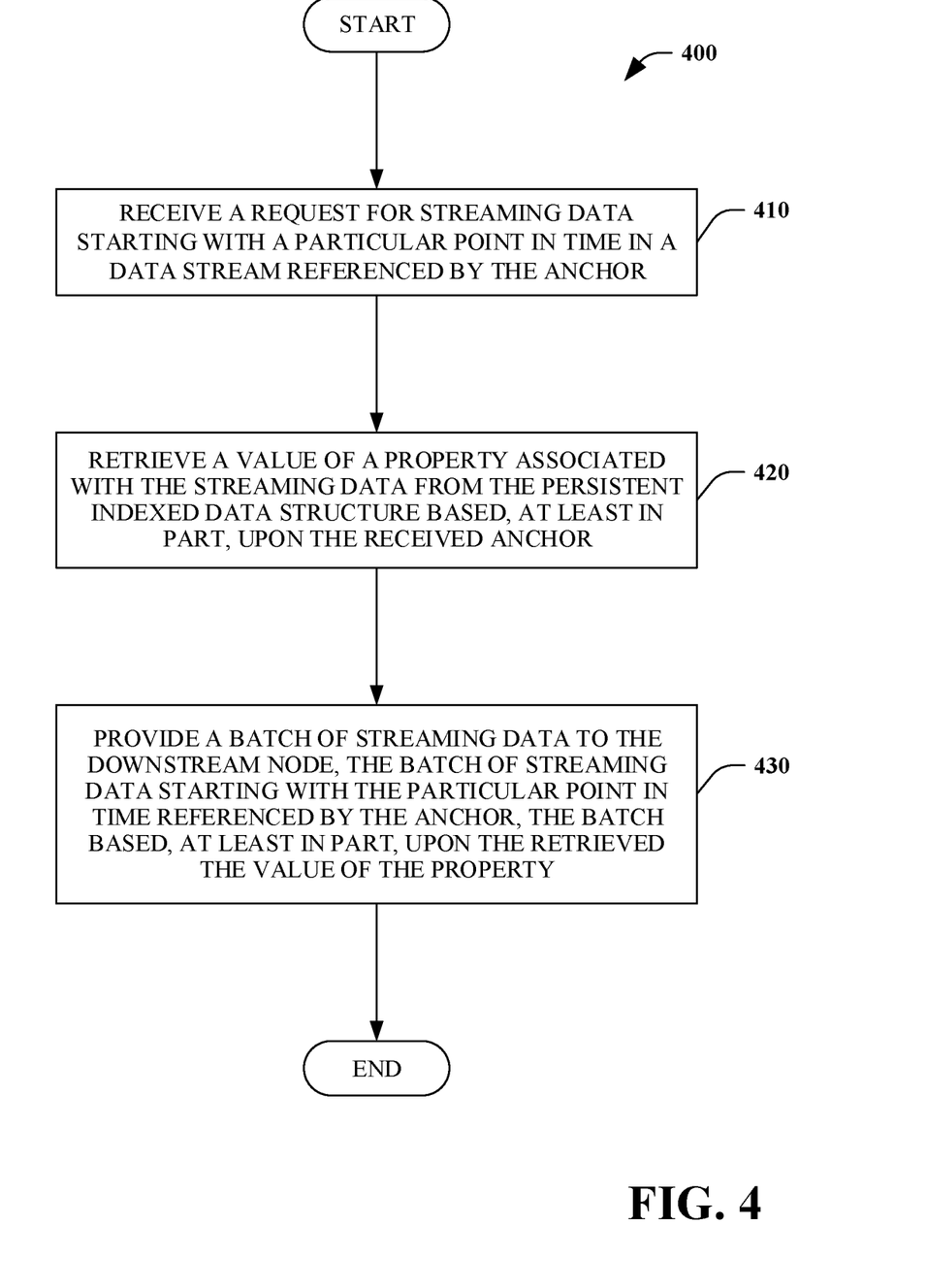
FIG. 4 is a flow chart that illustrates a method of utilizing a streaming data anchor.

Referring to FIG. 4, a method of utilizing a streaming data anchor 400 is illustrated. In some embodiments, the method 400 is performed by the input node 120. In some embodiments, the method 400 is performed by the input node 120 during recovery of output node(s) 130, and/or compute node(s) 120 of the streaming data processing system 110.

At 410, a request for streaming data starting with a particular point in time in a data stream referenced by the anchor is received. At 420, a value of a property associated with the streaming data is retrieved from the persistent indexed data structure based, at least in part, upon the received anchor. At 430, a batch of streaming data to the downstream node is provided in response to the request for streaming data. The batch of streaming data starts with the particular point in time referenced by the anchor. The batch is based, at least in part, upon the retrieved the value of the property.

Figure 5:
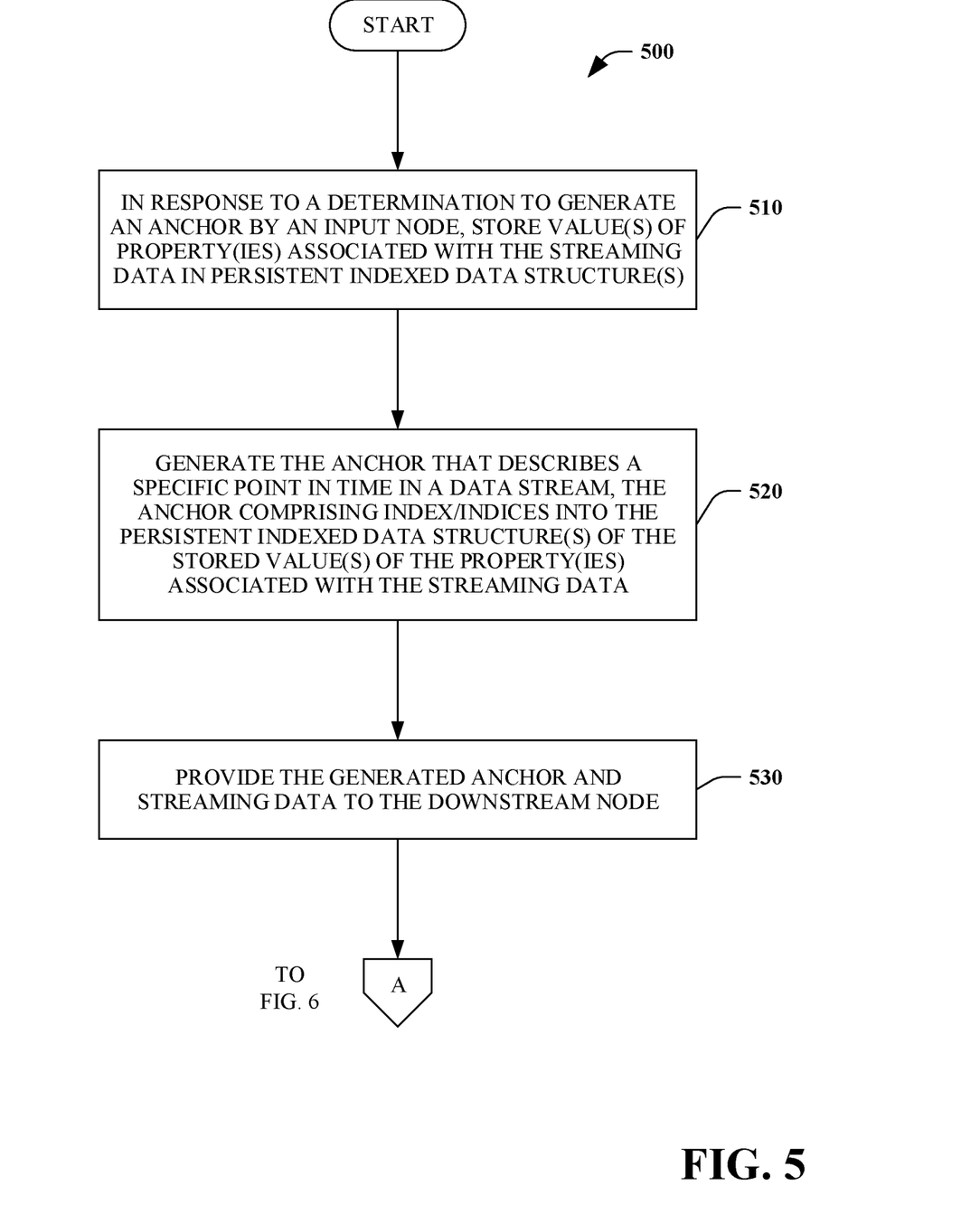
FIG. 5 is a flow chart that illustrates a method of journaling of streaming anchor resource(s).
Figure 6:
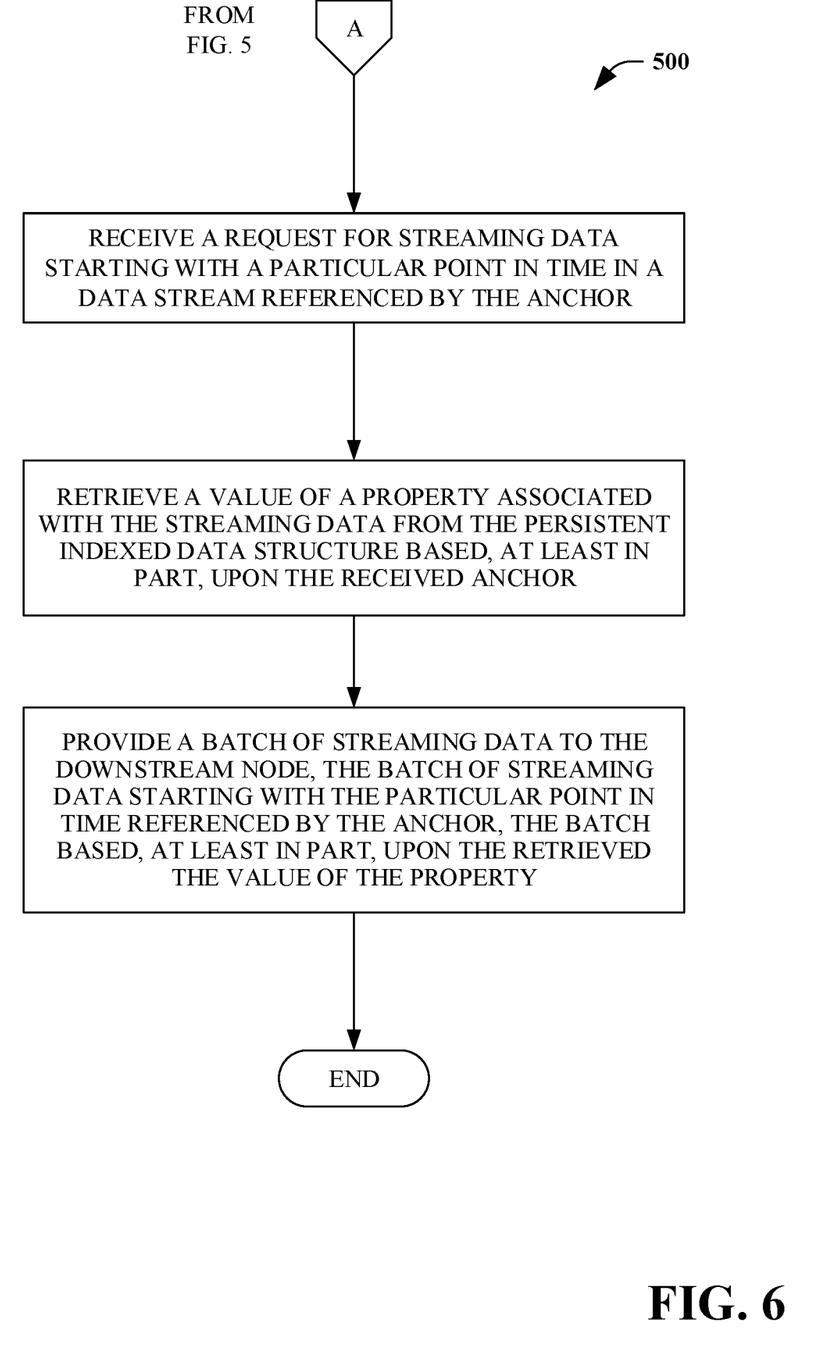
FIG. 6 is a flow chart that further illustrates the method of FIG. 5.

Next, referring to FIGS. 5 and 6, a method of journaling of streaming anchor resource(s) 500 is illustrated. In some embodiments, the method 500 is performed by the input node 120. In some embodiments, acts 510-530 occur during normal operation of the streaming data processing system 110, and acts 540-560 occur during recovery of the streaming data processing system 110.

At 510, in response to a determination to generate an anchor by an input node, value(s) of property(ies) associated with the streaming data is stored in one or more persistent indexed data structure(s). At 520, the anchor that describes a specific point in time in a data stream is generated. The anchor includes index/indices into the persistent indexed data structure(s) of the stored value(s) of the property(ies) associated with the streaming data. At 530, the generated anchor and streaming data are provided to the downstream node.

At 540, a request for streaming data starting with a particular point in time in a data stream referenced by the anchor is received. At 550, using the received anchor, value(s) of property(ies) associated with the streaming data are received from the persistent indexed data structure(s). At 560, provide a batch of streaming data is provided to the downstream node. The batch of streaming data starts with the particular point in time referenced by the anchor. The batch is based, at least in part, upon the retrieved the value of the property.

Described herein is a system for journaling of a streaming anchor resource, comprising: a processing system comprising a processor and a memory having computer-executable instructions stored thereupon which, when executed by the processor, cause the processing system to: by an input node of a streaming data processing system: in response to a determination to generate an anchor by the input node, store a value of a property associated with streaming data in a persistent indexed data structure; generate the anchor that describes a particular point in time in a data stream, the anchor comprising an index into the persistent indexed data structure of the stored value of the property associated with the streaming data; and provide the generated anchor and streaming data to the downstream node.

The system can include the memory having further computer-executable instructions stored thereupon which, when executed by the processor, cause the processing system to: receive a request for streaming data starting with a particular point in time in a data stream referenced by the anchor; retrieve a value of a property associated with the streaming data from the persistent indexed data structure based, at least in part, upon the received anchor; and provide a batch of streaming data to the downstream node, wherein the batch of streaming data starts with the particular point in time referenced by the anchor, and, the batch of streaming data is based, at least in part, upon the retrieved the value of the property.

The system can further include wherein a plurality of values of a particular property are stored in the persistent indexed data structure. The system can further include wherein the plurality of values are stored in an append only ordered collection. The system can further include wherein the property comprises a textual attribute associated with the streaming data and comprises a name of an event hub, or a full path of a blob.

The system can further include wherein during execution of a streaming job, a downstream node is configured to determine whether the anchor describes a point in an output stream before, after, or equal to another anchor. The system can further include wherein the persistent indexed data structure is stored physically separate from the streaming data processing system.

Described herein is a method of journaling of streaming an anchor resource, comprising: by an input node of a streaming data processing system: in response to a determination to generate an anchor by the input node, storing a value of a property associated with the streaming data in a persistent indexed data structure; generating the anchor that describes a particular point in time in a data stream, the anchor comprising an index into the persistent indexed data structure of the stored value of the property associated with the streaming data; and providing the generated anchor and streaming data to the downstream node.

The method can further include receiving a request for streaming data starting with a particular point in time in a data stream referenced by the anchor; retrieving a value of a property associated with the streaming data from the persistent indexed data structure based, at least in part, upon the received anchor; and providing a batch of streaming data to the downstream node, wherein the batch of streaming data starts with the particular point in time referenced by the anchor, and, the batch of streaming data is based, at least in part, upon the retrieved the value of the property.

The method can further include wherein a plurality of values of a particular property are stored in the persistent indexed data structure. The method can further include wherein the plurality of values are stored in an append only ordered collection. The method can further include wherein the property comprises a textual attribute associated with the streaming data.

The method can further include wherein the property comprises a name of an event hub, or a full path of a blob. The method can further include wherein the persistent indexed data structure is stored physically separate from the streaming data processing system, and wherein during execution of a streaming job, a down-stream node is configured to determine whether the anchor describes a point in an output stream before, after, or equal to another anchor.

Described herein is a computer storage media storing computer-readable instructions that when executed cause a computing device to: in response to a determination to generate an anchor by an input node, store a value of a property associated with the streaming data in a persistent indexed data structure; generate the anchor that describes a particular point in time in a data stream, the anchor comprising an index into the persistent indexed data structure of the stored value of the property associated with the streaming data; and provide the generated anchor and streaming data to the downstream node.

The computer storage media can store further computer-readable instructions that when executed cause a computing device to: receive a request for streaming data starting with a particular point in time in a data stream referenced by the anchor; retrieve a value of a property associated with the streaming data from the persistent indexed data structure based, at least in part, upon the received anchor; and provide a batch of streaming data to the downstream node, wherein the batch of streaming data starts with the particular point in time referenced by the anchor, and, the batch of streaming data is based, at least in part, upon the retrieved the value of the property.

The computer storage media can further include wherein a plurality of values of a particular property are stored in the persistent indexed data structure. The computer storage media can further include wherein the plurality of values are stored in an append only ordered collection. The computer storage media can further include wherein the property comprises a textual attribute associated with the streaming data. The computer storage media can further include wherein the property comprises at a name of an event hub, or a full path of a blob.

Figure 7:
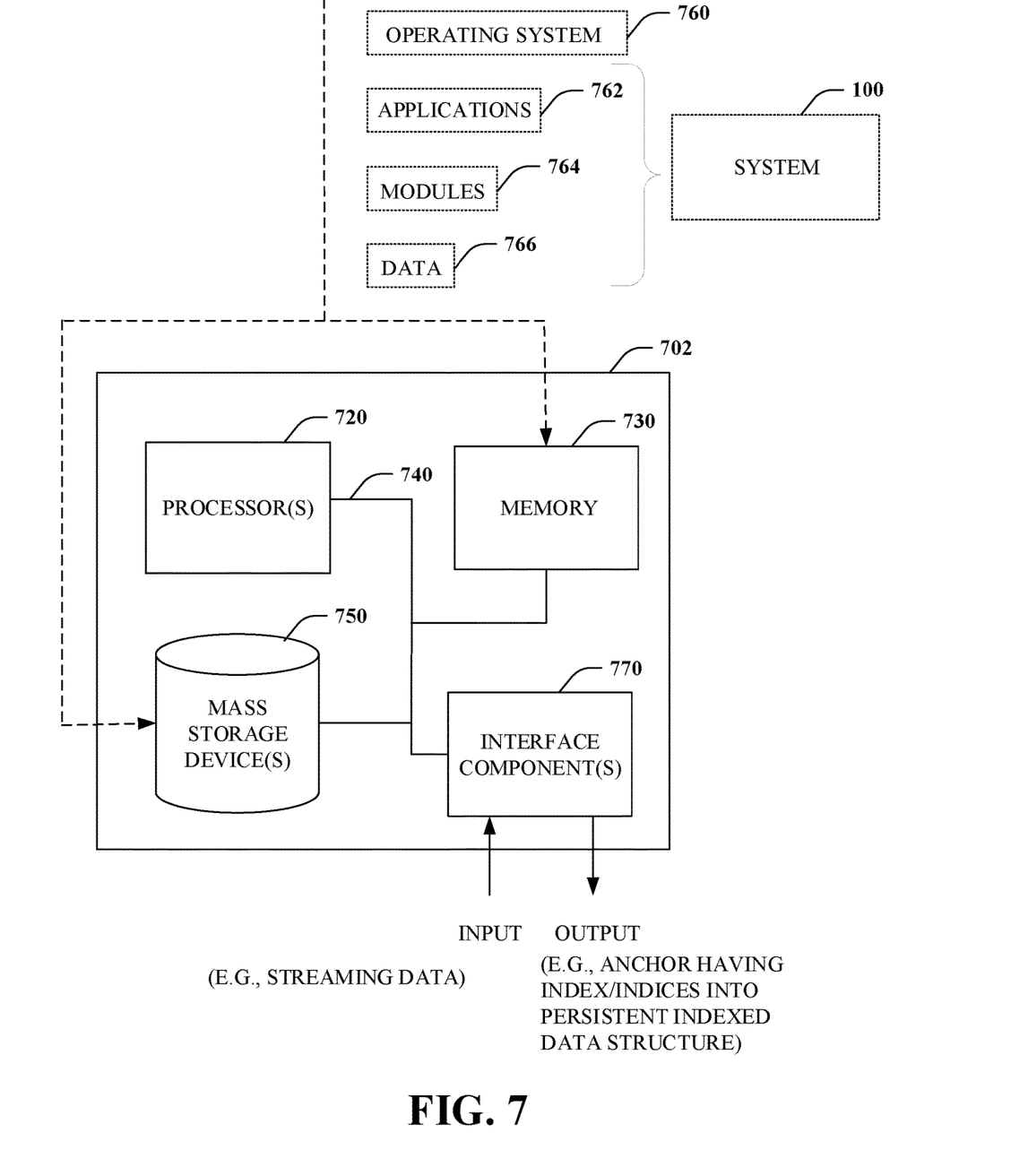
FIG. 7 is a functional block diagram that illustrates an exemplary computing system.

With reference to FIG. 7, illustrated is an example general-purpose computer, processing system, or computing device 702 (e.g., mobile phone, desktop, laptop, tablet, watch, server, hand-held, programmable consumer or industrial electronics, set-top box, game system, compute node, etc.). For instance, the computing device 702 may be used in a system for journaling of a streaming anchor resource 100.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In some embodiments, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g. serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   at least one processor; and
   a memory having computer-executable instructions stored thereupon which, when executed by the at least one processor, cause the system to act as an input node of a streaming data processing system by configuring the input node to:
   generate a plurality of anchors;
   generate numerical index values in a specified order for individual anchors of the plurality;
   include, in respective anchors of the plurality, respective numerical index values;
   store respective values of a textual property associated with streaming data of a data stream in a persistent indexed data structure, the respective values of the textual property identifying one or more resources that provide the streaming data;
   send the plurality of anchors and the streaming data to a down-stream node; and
   perform subsequent recovery processing by using a particular numerical index value included in a particular anchor to retrieve, from the persistent indexed data structure, a particular value of the textual property pointing to a particular resource that provides particular streaming data associated with the particular anchor.

2. The system of claim 1, the memory having further computer-executable instructions that configure the input node to perform the subsequent recovery processing by:
   receiving, from the downstream node, a streaming data request identifying the particular numerical index value included in the particular anchor; and
   providing a batch of streaming data to the downstream node, wherein the batch of streaming data starts with a particular point in time identified by the particular anchor, and the batch of streaming data is retrieved from the particular resource.

3. The system of claim 1, wherein the specified order is a strictly growing order.

4. The system of claim 3, wherein the persistent indexed data structure comprises an append only ordered collection.

5. The system of claim 1, wherein the particular value of the textual property comprises a name of an event hub, or a full path of a blob.

6. The system of claim 1, wherein the downstream node is configured to determine whether the particular anchor describes a point in an output stream before, after, or equal to another anchor.

7. The system of claim 1, wherein the persistent indexed data structure is stored physically separate from the streaming data processing system.

8. A method comprising:
   by an input node of a streaming data processing system:
   generating a plurality of anchors;
   generating numerical index values in a specified order for individual anchors of the plurality;
   including, in respective anchors of the plurality, respective numerical index values;
   storing respective values of a textual property associated with streaming data of a data stream in a persistently-stored journal, the respective values of the textual property identifying one or more resources that provide the streaming data;
   providing the plurality of anchors and the streaming data to a downstream node; and
   recovering from a subsequent failure in the streaming data processing system by using a particular numerical index value included in a particular anchor to retrieve, from the persistently-stored journal, a particular value of the textual property pointing to a particular resource that provides particular streaming data associated with the particular anchor.

9. The method of claim 8, the recovering comprising:
   receiving, by the input node, a request from the downstream node identifying the particular numerical index value included in the particular anchor; and
   providing a batch of streaming data to the downstream node, wherein the batch of streaming data starts with a particular point in time identified by the particular anchor, and the batch of streaming data is retrieved from the particular resource.

10. The method of claim 9, wherein the specified order is a strictly growing order.

11. The method of claim 10, wherein the respective values of the textual property are stored in an append only ordered collection with corresponding numerical index values in the persistently-stored journal.

12. The method of claim 8, wherein the respective values of the textual property comprise names of one or more event hubs, or full paths of blobs.

13. The method of claim 8, wherein the persistently-stored journal is stored physically separate from the streaming data processing system, and the method further comprises:
   during execution of a streaming job, determining, by the downstream node, whether the particular anchor describes a point in an output stream before, after, or equal to another anchor.

14. The method of claim 8, wherein the particular value of the textual property comprises a resource identifier.

15. The method of claim 8, wherein the particular value of the textual property comprises a full path of a data object.

16. A computer storage media storing computer-readable instructions that, when executed, cause a computing device to act as an input node in a streaming data processing system by:
   generating a plurality of anchors;
   generating numerical index values in a specified order for individual anchors of the plurality;
   including, in respective anchors of the plurality, respective numerical index values;
   storing respective values of a textual property associated with streaming data of a data stream in a persistent indexed data structure, the respective values of the textual property identifying one or more resources that provide the streaming data;
   providing the plurality of anchors and the streaming data to a downstream node; and
   recovering from a subsequent failure in the streaming data processing system by using a particular numerical index value included in a particular anchor to retrieve, from the persistent indexed data structure, a particular value of the textual property pointing to a particular resource that provides particular streaming data associated with the particular anchor.

17. The computer storage media of claim 16, storing further computer-readable instructions that, when executed, cause the computing device to act as the input node by:

receiving a request from the downstream node identifying the particular numerical index value included in the particular anchor; and providing a batch of streaming data to the downstream node, wherein the batch of streaming data starts with a particular point in time identified by the particular anchor, and the batch of streaming data is obtained from the particular resource pointed to by the particular value of the textual property.

18. The computer storage media of claim 16, wherein the specified order is a strictly growing order.

19. The computer storage media of claim 18, wherein the persistent indexed data structure comprises an append only ordered collection.

20. The computer storage media of claim 16, wherein the particular value of the textual property comprises at a name of an event hub, or a full path of a blob.

* * * * *